United States Patent
Geris et al.

(10) Patent No.: US 9,432,323 B2
(45) Date of Patent: Aug. 30, 2016

(54) METHOD, SYSTEM AND APPARATUS FOR PROVIDING NOTIFICATIONS FOR DIFFERENT WORKSPACES

(71) Applicant: Research In Motion Limited, Waterloo (CA)

(72) Inventors: Ryan Alexander Geris, Kitchener (CA); Hussein Bahadur Nagji, Kitchener (CA); Garry Owen Morgan, Mississauga (CA); Sidi El Becaye Maiga, Kitchener (CA); William Keith Baker, Belfountain (CA); Jason Lance Slupeiks, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 298 days.

(21) Appl. No.: 13/723,447

(22) Filed: Dec. 21, 2012

(65) Prior Publication Data
US 2014/0181222 A1    Jun. 26, 2014

(51) Int. Cl.
*H04L 12/58*        (2006.01)
(52) U.S. Cl.
CPC .................................... *H04L 51/24* (2013.01)
(58) Field of Classification Search
USPC .................. 709/206, 204–205; 715/765–767
See application file for complete search history.

(56) References Cited

U.S. PATENT DOCUMENTS

| | | | |
|---|---|---|---|
| 5,533,183 A * | 7/1996 | Henderson, Jr. ...... | G06F 3/0481 715/835 |
| 6,745,193 B1 | 6/2004 | Horvitz et al. | |
| 7,831,529 B2 | 11/2010 | Horvitz et al. | |
| 8,108,494 B1 * | 1/2012 | Holland et al. ............... | 709/220 |
| 8,346,932 B1 * | 1/2013 | Holland et al. ............... | 709/226 |
| 2003/0065722 A1 * | 4/2003 | Ieperen .......................... | 709/205 |
| 2004/0128150 A1 * | 7/2004 | Lundegren ......................... | 705/1 |
| 2004/0249885 A1 * | 12/2004 | Petropoulakis ........... | G06F 9/54 709/204 |
| 2004/0259525 A1 * | 12/2004 | Kotzin .......................... | 455/406 |
| 2006/0031340 A1 * | 2/2006 | Mathew et al. ............... | 709/206 |
| 2008/0250333 A1 * | 10/2008 | Reeves et al. ................. | 715/753 |
| 2008/0318616 A1 * | 12/2008 | Chipalkatti et al. ........ | 455/550.1 |
| 2009/0013043 A1 * | 1/2009 | Tan ...................... | G06Q 10/107 709/205 |
| 2009/0260010 A1 | 10/2009 | Burkhart et al. | |
| 2009/0307605 A1 * | 12/2009 | Ryan ...................... | G06Q 10/10 715/751 |
| 2011/0252320 A1 * | 10/2011 | Arrasvuori et al. .......... | 715/704 |
| 2012/0005692 A1 * | 1/2012 | Bulko et al. ................... | 719/328 |
| 2012/0096397 A1 * | 4/2012 | Ording ................ | G06F 3/04883 715/802 |
| 2012/0112908 A1 | 5/2012 | Prykari et al. | |
| 2013/0007837 A1 * | 1/2013 | King ................................ | 726/1 |
| 2013/0097234 A1 * | 4/2013 | Beinvel et al. ............... | 709/204 |

(Continued)

OTHER PUBLICATIONS

Corresponding European Patent Application No. 12199162.4 Search Report dated Jun. 5, 2013.

*Primary Examiner* — Abdullahi E Salad
(74) *Attorney, Agent, or Firm* — Perry + Currier, Inc.

(57) ABSTRACT

A method, system and apparatus for providing notifications for different workspaces is provided. The device comprises a processor, a memory, and a notification device, the processor enabled to: manage a first workspace and a second workspace distinguished from each other by one or more of: data stored at the memory being associated with one or another of the first workspace and the second workspace; and accounts being associated with the one or the another of the first workspace and the second workspace; and, when a current workspace comprises the first workspace, control the notification device to present first notifications associated only with the first workspace, while second notifications associated with the second workspace are not presented.

20 Claims, 13 Drawing Sheets

(56) References Cited

U.S. PATENT DOCUMENTS

| | | | |
|---|---|---|---|
| 2013/0227007 A1* | 8/2013 | Savage et al. | 709/204 |
| 2013/0254699 A1* | 9/2013 | Bashir et al. | 715/772 |
| 2013/0298140 A1* | 11/2013 | Wolfe | G06F 9/542 |
| | | | 719/319 |
| 2014/0006999 A1* | 1/2014 | Bukurak | G06F 3/0484 |
| | | | 715/778 |
| 2014/0019507 A1* | 1/2014 | Slakman et al. | 709/201 |
| 2014/0047345 A1* | 2/2014 | Fyke | G06F 3/048 |
| | | | 715/738 |

* cited by examiner

METHOD, SYSTEM AND APPARATUS FOR PROVIDING NOTIFICATIONS FOR DIFFERENT WORKSPACES

FIELD

The specification relates generally to mobile devices, and specifically to a method, system and apparatus for providing notifications for different workspaces.

BACKGROUND

The evolution of computers is currently quite active in the mobile device environment. It is now well-known to including calendaring, contacts, and messaging functions in mobile devices. More recently, there has been a veritable explosion of the number and type of applications that are configured to the unique form factors and computing environments of mobile devices.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
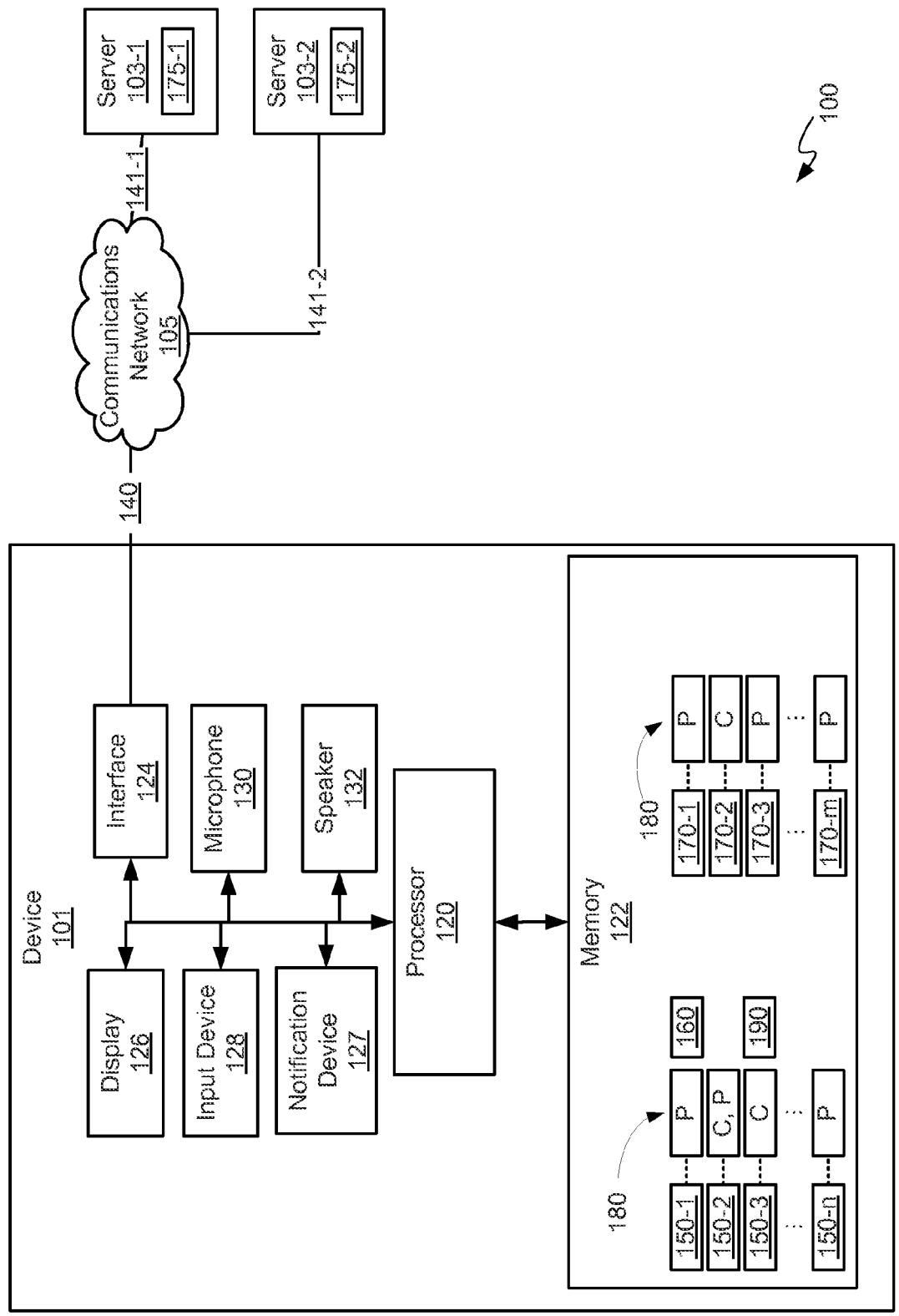
FIG. 1 depicts a system including a device for providing notifications for different workspaces, according to non-limiting implementations.

In this specification, elements may be described as "enabled to" perform one or more functions or "enabled for" such functions. In general, an element that is enabled to perform or enabled for performing a function is configured to perform the function, or is suitable for performing the function, or is adapted to perform the function, or is operable to perform the function, or is otherwise capable of performing the function.

The present specification provides a device comprising: a processor, a memory, and a notification device, the processor enabled to: manage a first workspace and a second workspace distinguished from each other by one or more of: data stored at the memory being associated with one or another of the first workspace and the second workspace; and accounts being associated with the one or the another of the first workspace and the second workspace; and, when a current workspace comprises the first workspace, control the notification device to present first notifications associated only with the first workspace, while second notifications associated with the second workspace are not presented.

The processor can be further enabled to: manage the first workspace and a plurality of further workspaces; and, when the current workspace comprises the first workspace, control the notification device to present first notifications associated only with the first workspace, while further notifications associated with the plurality of further workspaces are not presented.

The processor can be further enabled to, when the current workspace comprises the first workspace, control the notification device to present the first notifications for a first account associated with the first workspace, while second notifications associated with a second account associated with the second workspace are not presented.

The memory can store exception conditions and the processor can be further enabled to control the notification device to present the first notifications and the second notifications associated with one or more of the exception conditions, regardless of whether the current workspace can comprise the first workspace or the second workspace.

The processor can be further enabled to: when the current workspace changes to the second workspace, control the notification device to present the second notifications associated only with the second workspace, while first notifications associated with the first workspace are not presented.

The processor can be further enabled to: store indications of events associated with the second workspace while the current workspace comprises the first workspace, and when the current workspace changes to the second workspace, control the notification device to present the second notifications of the indications of events that have been previously stored.

The processor can be further enabled to: store indications of events associated with the second workspace while the current workspace comprises the first workspace, and when the current workspace changes to the second workspace, control the notification device to present one or more of: a given number of the second notifications of the indications of events that have been previously stored within a given time period; and the second notifications of the indications of events that have been previously stored within a given time period.

Each of the first workspace and the second workspace can be further distinguished from each other by one or more of respective partitions of the memory and respective virtual partitions of the memory.

The first workspace can comprise one of a private workspace and a public workspace and the second workspace can comprise an other of the private workspace and the public workspace.

The first notifications and the second notifications can each be associated with an application associated with one or more of the first workspace and the second work space, and the first notifications and the second notifications can be associated with respective accounts associated with the first workspace and the second workspace.

The notification device can comprise one or more of a display, a light, a vibration motor, a haptic device, and a speaker.

A further aspect of the specification provides a method comprising: managing a first workspace and a second workspace at a processor of a device comprising the processor, a memory and a notification device, the first workspace and the second workspace distinguished from each other by one or more of: data stored at the memory being associated with one or another of the first workspace and the second workspace; and accounts being associated with the one or the another of the first workspace and the second workspace; and, when a current workspace comprises the first workspace, controlling, at the processor, the notification device to present first notifications associated only with the first workspace, while second notifications associated with the second workspace are not presented.

The method can further comprise: managing, via the processor, the first workspace and a plurality of further workspaces; and, when the current workspace comprises the first workspace, controlling, via the processor, the notification device to present first notifications associated only with the first workspace, while further notifications associated with the plurality of further workspaces are not presented.

The method can further comprise, when the current workspace comprises the first workspace, controlling, via the processor, the notification device to present the first notifications for a first account associated with the first workspace, while second notifications associated with a second account associated with the second workspace are not presented.

The memory stores exception conditions and the method can further comprise controlling, via the processor, the notification device to present the first notifications and the second notifications associated with one or more of the exception conditions, regardless of whether the current workspace can comprise the first workspace or the second workspace.

The method can further comprise, when the current workspace changes to the second workspace, controlling, via the processor, the notification device to present the second notifications associated only with the second workspace, while first notifications associated with the first workspace are not presented.

The method can further comprise, storing indications of events associated with the second workspace while the current workspace comprises the first workspace, and when the current workspace changes to the second workspace, controlling the notification device to present the second notifications of the indications of events that have been previously stored.

The method can further comprise, storing indications of events associated with the second workspace while the current workspace comprises the first workspace, and when the current workspace changes to the second workspace, controlling the notification device to present one or more of: a given number of the second notifications of the indications of events that have been previously stored within a given time period; and the second notifications of the indications of events that have been previously stored within a given time period.

The first notifications and the second notifications can each be associated with an application associated with one or more of the first workspace and the second work space, and the first notifications and the second notifications are associated with respective accounts associated with the first workspace and the second workspace.

Yet a further aspect of the specification provides a computer program product, comprising a computer usable medium having a computer readable program code adapted to be executed to implement a method comprising: managing a first workspace and a second workspace at a processor of a device comprising the processor, a memory and a notification device, the first workspace and the second workspace distinguished from each other by one or more of: data stored at the memory being associated with one or another of the first workspace and the second workspace; and accounts being associated with the one or the another of the first workspace and the second workspace; and, when a current workspace comprises the first workspace, controlling, at processor, the notification device to present first notifications associated only with the first workspace, while second notifications associated with the second workspace are not presented. The computer program product can comprise a non-transitory computer program product.

FIG. 1 depicts a system 100 comprising a device 101 for providing notifications in different workspaces, according to non-limiting implementations. System 100 generally comprises device 101 in communication with servers 103-1, 103-2 via at least one communications network 105, according to non-limiting implementations. The at least one communications network 105 will be interchangeably referred to hereafter as network 105. Servers 103-1, 103-2 will be interchangeably referred to hereafter, collectively, as servers 103 and generically as a server 103. Device 101 comprises a processor 120 interconnected with a memory 122, a communications interface 124, a display 126, a notification device 127, and an input device 128, and optionally a microphone 130 and speaker 132.

It is further appreciated that device 101 communicates with servers 103 via interface 124, a link 140 between device 101 and network 105, and a link 141-1 between server 103-1 and network 105, and a link 141-2 between server 103-2 and network 105. Links 141-1, 141-2 will be interchangeably referred to hereafter, collectively, as links 141 and generically as a link 141. It is further appreciated that while only two servers 103 are depicted in FIG. 1, device 101 can be in communication with more than two servers 103, for example, a server for each account associated with device 101, as described below.

Device 101 further stores applications 150-1, 150-2, 150-3 . . . 150-*n* at memory 122. Applications 150-1, 150-2, 150-3 . . . 150-*n* will also be referred to hereafter generically as an application 150 and collectively as applications 150. Furthermore, device 101 can store any number of applications 150.

Device 101 further stores an application 160 for providing notifications for different workspaces at memory 122, as described further below.

Device 101 further stores data 170-1, 170-2, 170-3 . . . 170-*m* at memory 122. Data 170-1, 170-2, 170-3 . . . 170-*m* will also be referred to hereafter generically as a set of data 170 and collectively as data 170. Further device 101 can store any suitable amount of data 170.

Each server 103 is associated with a respective account 175-1, 175-2. Accounts 175-1, 175-2 will also be referred to hereafter generically as accounts 175 and collectively as accounts 175. Each account 175 can comprise data associated with one or more of applications 150 and/or one or more set of data 170 at device 101. For example, one or more of applications 150 can comprise a messaging application for receiving messages associated with accounts 175 from servers 103. It is appreciated that data 170 can include data indicating subscriptions to accounts 175, and that such subscriptions and such data can be provisioned in a subscription process.

It is further appreciated that while only one account 175 is associated with each server 103, present implementations are not so limited and more than one account 175 can be associated with each server 103. Indeed, each server 103 can comprise a message server that manages and consolidates messages for plurality of accounts for different respective workspaces at device 101, and each server 103 can in turn be in communication with further message servers further associated with each of the plurality of accounts. For example, a server 103 can consolidate messages from social network sites, and commercial and/or corporate message servers and the like.

Each application 150, and each set of data 170 is further associated with an identifier at memory 122 as indicated by tags 180, each tag 180 identifying a respective association between applications 150 and/or data 170 with one of at least two different workspaces, including a first workspace and a second workspace. For example, other given applications 150 and/or other set of data 170 associated with a tag "P", as depicted, indicates that the other given applications 150 and/or other sets of data 170 are associated with a first workspace associated with a personal environment. Similarly, given applications 150 and/or given sets of data 170 associated with a tag "C", as depicted, indicates that the given applications 150 and/or given sets of data 170 are associated with a second workspace associated with a corporate environment. It is appreciated that the "personal" and "corporate" workspaces described herein, as well as the associated tags "P" and "C", are provided only as examples of a first workspace and a second workspace and are not to be considered particularly limiting. Indeed, the association between each application 150, and each set of data 170 and a given workspace can be made in any suitable manner, including, but not limited to, tags, identifiers, database entries, database categories and the like.

Further, associations between applications 150 and/or data 170, and workspaces can also be provided via the absence of a tag 180 and the like: for example, in some implementations, applications 150 and data 170, associated with a corporate workspace can be tagged with a tag "C", while applications 150 and data 170 associated with a personal workspace can be untagged, the association with a personal workspace (or at least a second workspace that is not the corporate workspace) implicit by the absence of a tag 180.

It is further appreciated that each of accounts 175 can be associated with a given workspace by either subscription data stored in one or more sets of data 170 being tagged with a given tag 180, and/or by an account 175 being associated with a server 103 that is in turn associated with a given workspace. Such associations between accounts, 175, servers 103 and workspaces can also be stored in data 170. In other words, an account 175 can be associated with a given workspace by virtue of a further association between one or more of associated data 170 and the given workspace, and an associated server 103 and the given workspace.

It is yet further appreciated that one or more of applications 150 can be associated with more than one workspace. For example, application 150-2 is associated with both a first workspace and a second workspace as indicated by application 150-2 being associated with tags "C" and "P".

Further, workspace can interchangeably referred to as perimeters; for example, present implementations are appreciated to place perimeters around applications 150 and data 170, depending on tag associations, as will presently be explained.

As such, each workspace can be also interchangeably referred to as one or more of partitions of memory 122 and/or virtual partitions of memory 122. In other words, in some implementations, memory 122 can be physically portioned into a first partition for storing applications 150, data 170 associated with a first workspace (e.g. a corporate workspace) and a second partition for storing applications 150, data 170 associated with a second workspace (e.g. a personal workspace). In other implementations, tags 180 associated with applications 150, and data 170 result in a virtual partition of memory 122, even though memory 122 is not physically partitioned.

When an application 150 is associated with more than one tag, such as application 150-2, that application 150 can be referred to as being within both workspaces and/or within both perimeters and/or spanning a partition of memory 122 and/or spanning a virtual partition of memory 122.

In any event, processor 120 is generally enabled to: manage a first workspace and a second workspace distinguished from each other by one or more of: data 170 stored at memory 122 being associated with one or another of the first workspace and the second workspace; and accounts 175 being associated with the one or the another of the first workspace and the second workspace; and, when a current workspace comprises the first workspace, control notification device 127 to present first notifications associated only with the first workspace, while second notifications associated with the second workspace are not presented.

Device 101 can be any type of electronic device that can be used in a self-contained manner to process applications 150, 160. Device 101 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations.

Each of servers 103 generally comprise a server associated with at least one account 175, as described above. In some implementations, one of servers 103 (e.g. server 103-1) can be associated with an entity that provides accounts for personal messages and the like; in some of these implementations, the other of servers 103 (e.g. server 103-2) can be associated with a corporate entity that is, for example, further associated with the corporate workspace of device 101. Hence at least one account 175 associated with a first workspace can be associated with one of servers 103, and at least one other account 175 associated with a second workspace can be associated with another of servers 103.

In any event, each server 103 is generally enabled to push data and/or messages associated with respective workspaces of device 101, to device 101. Each server 103 can otherwise be based on any well-known server environment including a module that houses one or more central processing units, volatile memory (e.g. random access memory), persistent memory (e.g. hard disk devices) and network interfaces to allow each server 103 to communicate over a respective link 141. For example, each server 103 comprise a Sun Fire 8800 series server running a UNIX operating system, from Oracle Corporation, Inc. of Santa Clara Calif., and having eight central processing units each operating at about three thousand megahertz and having more than sixteen gigabytes of random access memory. However, it is to be emphasized that this particular server is merely a non-limiting example, and a vast array of other types of computing environments for servers 103 are contemplated. It is further more appreciated that each server 103 can comprise any more than one server that can perform different functionality of server implementations described herein.

Link 140 comprises any suitable link for enabling device 101 to communicate with network 105. Similarly, links 141 comprise any suitable link for enabling each respective server 103 to communicate with network 105. Links 140, 141 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth™ links, NFC (near field communication) links, WiFi links, WiMax links, packet based links, the Internet, analog networks, the PSTN (public switched telephone network), access points, and the like, and/or a combination.

It is appreciated that FIG. 1 further depicts a schematic diagram of device 101 according to non-limiting implementations. It should be emphasized that the structure of device 101 in FIG. 1 is purely an example, and contemplates a device that can be used for both wireless voice (e.g. telephony) and wireless data communications (e.g. email, web browsing, text, and the like). However, while FIG. 1 contemplates a device that can be used for telephony, in other implementations, device 101 can comprise a device enabled for implementing any suitable specialized functions, including but not limited to one or more of telephony, computing, appliance, and/or entertainment related functions.

Device 101 comprises at least one input device 128 generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations. In specific non-limiting implementations described herein, input device 128 comprises a touch screen for receiving touch input data.

Input from input device 128 is received at processor 120 (which can be implemented as a plurality of processors, including but not limited to one or more central processors (CPUs)). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art recognize that memory 122 is an example of computer readable media that can store programming instructions executable on processor 120. Furthermore, memory 122 is also an example of a memory unit and/or memory module.

In particular, it is appreciated that memory 122 stores application 160, different from applications 150 that, when processed by processor 120, enables processor 120 to: manage a first workspace and a second workspace distinguished from each other by one or more of: data 170 stored at memory 122 being associated with one or another of the first workspace and the second workspace; and accounts 175 being associated with the one or the another of the first workspace and the second workspace; and, when a current workspace comprises the first workspace, control notification device 127 to present first notifications associated only with the first workspace, while second notifications associated with the second workspace are not presented. Second notifications not being presented can also be referred to as notification suppression and/or notification delay, as will be described in more detail below.

It is yet further appreciated that applications 150, 160 are examples of programming instructions stored at memory 122.

However, in some implementations, as depicted, memory 122 further stores exception conditions 190 and processor 120 is further enabled to control notification device 127 to present the first notifications and the second notifications associated with one or more of exception conditions 190, regardless of whether the current workspace comprises the first workspace or the second workspace.

It is yet further appreciated that exceptions conditions 190 comprise data indicative of logic rules for which exceptions to notification suppression apply, as described in further detail below. It is yet further appreciated that while exceptions conditions 190 is referred to in the plural, exceptions conditions 190 can comprise one or more exception conditions. Indeed, in some implementations, exception conditions 190 can comprise an empty set and no exception conditions will apply for notification suppression. Data stored in exception conditions 190 can include, but is not limited to a list of electronic addresses, email addresses[[d]], and the like, for which notification suppression is not to occur.

Processor 120 in turn can also be configured to communicate with a display 126, and optionally a microphone 130 and a speaker 132. Display 126 comprises any suitable one of or combination of CRT (cathode ray tube) and/or flat panel displays (e.g. LCD (liquid crystal display), plasma, OLED (organic light emitting diode), capacitive or resistive touch screens, and the like). When display 126 comprises a touch screen, it is appreciated that display 126 and input device 128 are combined into one apparatus. Microphone 130, when present, comprises any suitable microphone for receiving sound data. Speaker 132, when present, comprises any suitable speaker for providing sound data, audible alerts, audible communications from remote communication devices, and the like, at device 101.

In some implementations, input device 128 and display 126 are external to device 101, with processor 120 in communication with each of input device 128 and display 126 via a suitable connection and/or link.

Notification device 127 comprises any combination of devices for presenting one or more of visual notifications, audible notifications, inaudible notifications, haptic notifications, vibratory notifications, and the like. Hence, notification device 127 can comprise any suitable combination of notification devices including but not limited to vibration devices, vibration motors, lights, LEDs (light emitting diodes), display 126, and speaker 132. In other words, while notification device 127 is depicted as a separate device from display 126 and speaker 132, in some implementations, display 126 and speaker 132 can each be a notification device for providing workspace specific notifications.

Processor 120 also connects to interface 124, which can be implemented as one or more radios and/or connectors and/or network adaptors, configured to communicate with network 105 via link 140. In general, it will be appreciated that interface 124 is configured to correspond with the network architecture that is used to implement link 140, as described above. In other implementations a plurality of links with different protocols can be employed and thus interface 124 can comprise a plurality of interfaces to support each link.

In any event, it is appreciated that any suitable combination of interfaces is within the scope of present implementations.

Further, it should be understood that in general a wide variety of configurations for device 101 are contemplated.

Figure 2:
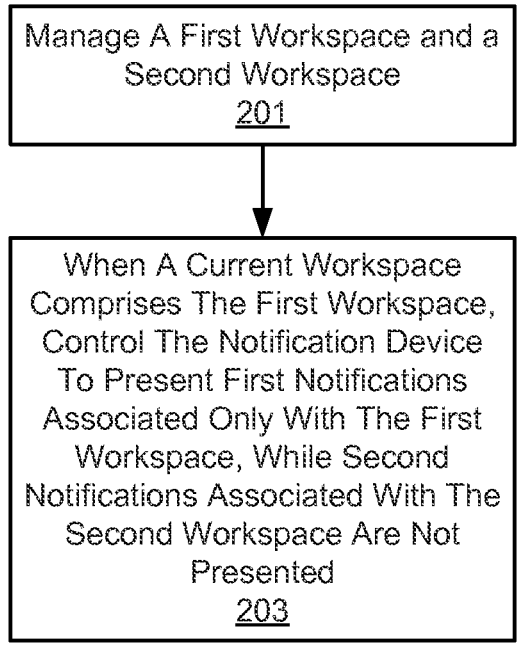
FIG. 2 depicts a flowchart of a method for providing notifications for different workspaces, according to non-limiting implementations.

Attention is now directed to FIG. 2 which depicts a flowchart of a method 200 providing notifications for different workspaces, according to non-limiting implementations. In order to assist in the explanation of method 200, it will be assumed that method 200 is performed using system 100. Furthermore, the following discussion of method 200 will lead to a further understanding of system 100 and its various components. However, it is to be understood that system 100 and/or method 200 can be varied, and need not work exactly as discussed herein in conjunction with each other, and that such variations are within the scope of present implementations.

It is appreciated that, in some implementations, method 200 is implemented in system 100 by processor 120 of device 101. Indeed, method 200 is one way in which device 101 can be configured. It is to be emphasized, however, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood, however, that method 200 can be implemented on variations of system 100 as well.

At block 201, processor 120 manages a first workspace and a second workspace distinguished from each other by one or more of: data 170 stored at memory 122 being associated with one or another of the first workspace and the second workspace; and accounts 150 being associated with the one or the another of the first workspace and the second workspace.

It is further appreciated that the processor 120 manages the first workspace and the second workspace by: determining which of first workspace and second workspace new applications 150 and/or new data 170 and/or new accounts 175 are associated with and tagging new applications 150 and/or new data 170 (including account subscription data) with appropriate respective tags 180. For example, when new applications 150 and/or new data 170 are received and/or installed at device 101, and/or new accounts 175 are subscribed to, processor 120 can determine which of the first workspace and the second workspace each is associated with by: determining which of the first workspace and the second workspace is current when new applications 150 and/or new data 170 are received and/or installed, and/or new accounts 175 are subscribed to. Processor 120 can then tag new applications 150 and/or new data 170 (including but not limited to account subscription data) with a tag 180 associated with the current workspace.

However processor 120 can further manage the first workspace and the second workspace by managing the physical and/or virtual partitions between the first and second workspaces. Indeed, processor 120 can further manage the first workspace and the second workspace by performing any workspace specific function for each of the first workspace and the second workspace.

At block 203, when a current workspace comprises the first workspace, processor 120 controls notification device 127 to present first notifications associated only with the first workspace, while second notifications associated with the second workspace are not presented. For example, messages can be received from servers 103 and notifications for the received messages can be provided based on which workspace each message is associated with, and whether the current workspace comprises the associated workspace.

In a specific non-limiting example, when a current workspace comprises a personal workspace, and messages associated with a corporate account are received, no notifications associated with a corporate account are provided at notification device 127, unless one or more of the messages associated with the personal account are associated with one or more of exception conditions 190. In other words, notifications for the corporate account are suppressed.

Figure 3:
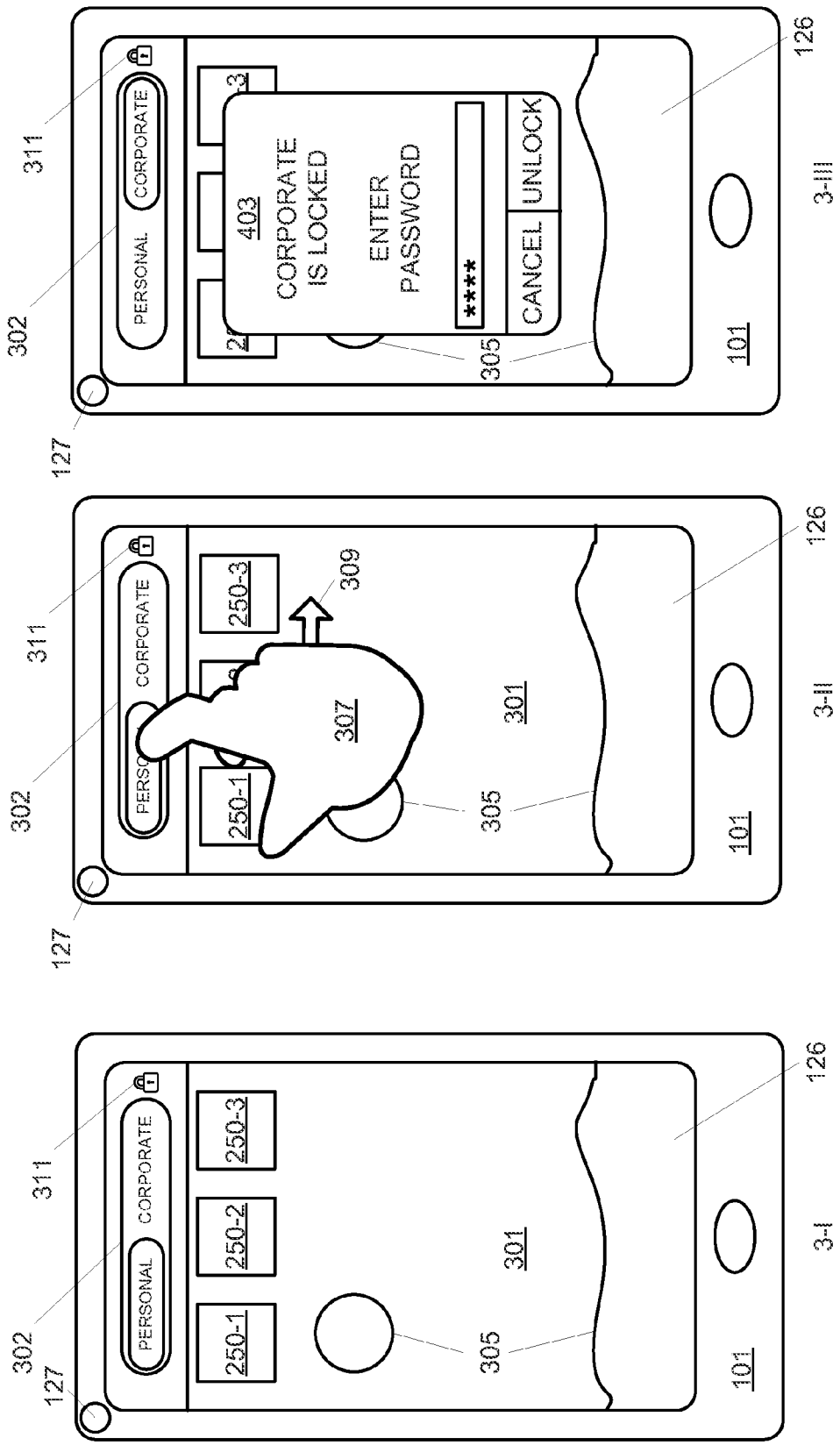
FIG. 3 depicts a sequence at the device of FIG. 1 for changing a current workspace from a first workspace to a second workspace, according to non-limiting implementations.
Figure 4:
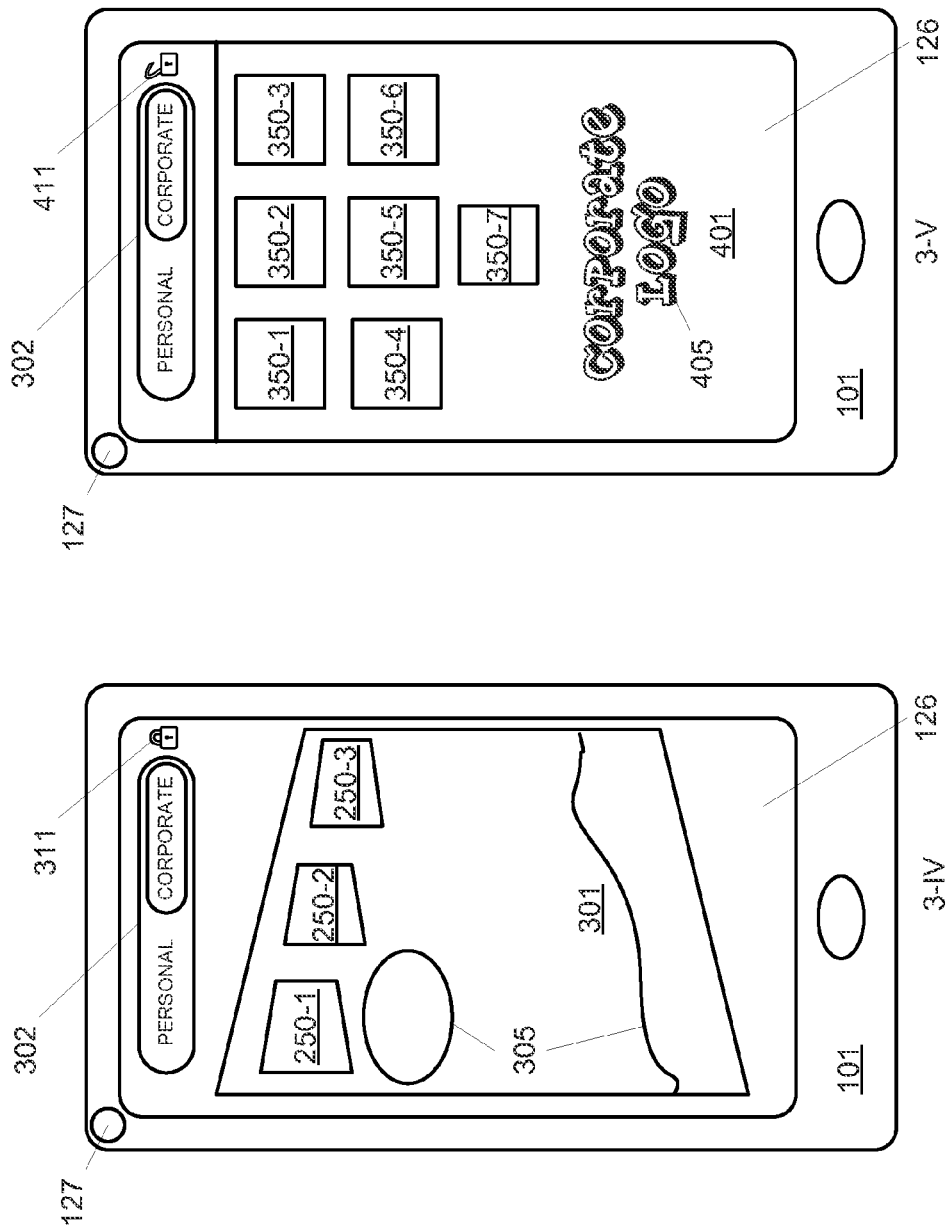
FIG. 4 depicts a continuation of the sequence of FIG. 3, according to non-limiting implementations.

A non-limiting example will now be described with reference to FIGS. 3 and 4 to further illustrate the concept of workspaces and a current workspace. FIGS. 3 and 4 depict perspective views 3-I, 3-II, 3-III, 3-IV and 3-V provided at display 126 of device 101, in a sequence. In the non-limiting example of FIGS. 3 and 4, it is assumed that input device 128 and/or display 126 comprises at least a touch screen device. Hence, implementations will be described with reference to touch input and touch screen events. However, it is appreciated that, in other implementations, other input devices can be used to assist with method 200.

It is further appreciated that each view 3-I, 3-II, 3-III, 3-IV and 3-V each shows graphic user interfaces (GUIs) associated with application 160.

Also depicted at FIGS. 3 and 4 is a non-limiting example of a notification device 127 which, in these implementations, can comprise one or more of an audio notification device (i.e. a speaker and the like) device and a visual notification device (e.g. a light, an LED (light emitting diode), and the like). However, display 126 can also be a notification device, as can any vibratory motors of device 101.

View 3-I shows a graphic representation of a first workspace 301 comprising icons 250-1, 250-2, 250-3. Icons 250-1, 250-2, 250-3 will be referred to generically as an icon 250 and collectively as icons 250. It is appreciated that each icon 250 corresponds to an application 150 associated with a first workspace 301. First workspace 301 can also be referred to as a "Personal" workspace, as indicated in virtual slider switch 302: in other words, at view 3-I, the text "Personal" is highlighted on slider switch 302.

Further, each icon 250 of first workspace 301 is associated with a respective application 150 which is in turn associated with tags "P" as depicted in FIG. 1. Indeed, in first workspace 301, only those icons 250 associated with applications with tags "P" are provided at first workspace 301. When an icon 250 is actuated, for example via a touch screen interaction, the corresponding application 150 will be processed by processor 120 and launched for interaction with a user via display 126 and input device 128.

It is yet further appreciated that processor 120 generally restricts access of applications 150 associated with first workspace 301 to data 170 and/or accounts 175 associated with first workspace 301. In other words, applications 150 associated with first workspace 301 can only access data 170 with tags "P". Access to data 170 associated with tags "C" is blocked; for example, when a given application 150 associated with first workspace 301 is opened, data 170 associated with tags "C" is not visible to the given application 150. Hence, first workspace 301 can be defined both by a graphic view 3-I in which only those icons 250 associated with applications 150 that are in turn associated with first workspace 301/"Personal" workspace, are provided at display 126. However, first workspace 301 can further be defined by the association of applications 150 and data 170 with tags 180 associated with first workspace 301, as well as the restriction of access to data 170 associated with first workspace 301.

From this perspective, at block 201, processor 120 manages first workspace 301 by one or more of: providing only those icons 250 associated with applications 150 that are in turn associated with first workspace 301, at display 126, when first workspace 301 is current; and managing associations between applications 150, data 170, accounts 175 and first workspace 301; and restricting access to data 170 and/or accounts 175 by applications 150 associated with first workspace 301 based on associations of data 170 and/or accounts 175 with first workspace 301 or a second workspace (e.g. second workspace 401 as described below). Hence, workspace 301 can also be referred as a perimeter around applications 150, data 170 (and accounts 175) associated therewith. Put another way, a perimeter is placed around applications 150, data 170 (and accounts 175) based on an association with tags "P", such that applications 150 associated with tag "C" cannot access or interact with applications 150, data 170 (and accounts 175) associated with tag "P". This prevents cross-contamination of applications 150, data 170 (and accounts 175) associated with different tag types.

However, it is appreciated that application 150-2 is tagged with both tags "C" and "P", and hence application 150-2 can access or interact with applications 150, data 170 (and accounts 175) associated with both tags "C" and "P".

In any event, view 3-I further depicts at least one identifier 305 associated with first workspace 301. It is yet further appreciated that at least one identifier 305 is provided at display 126 and only a current workspace comprises first workspace 301. Indeed, in view 3-I, it is appreciated that a current workspace comprises first workspace 301. In other words, first workspace 301 is one or more of current, active and the like. Hence, at least one identifier 305 comprises a current workspace identifier. When first workspace 301 is no longer a current workspace, at least one identifier 305 is no longer provided and a current workspace identifier associated with whatever workspace is current is provided: for example see the discussion below with respect to view 3-V.

At least one identifier 305 can include, but is not limited to features in a graphical identifier (for example an electronic photo associated with first workspace and stored at memory 122 (e.g. as data 170 tagged with a tag "P")), a given colour, given wallpaper, a background image and the like, all provided in an electronic format.

Attention is next directed to view 3-II, substantially similar to view 3-I but further depicting a finger of a hand 307 interacting with slide switch 302. A touch event is hence detected at display 126 in the area of slide switch 302, in which slide switch 302 is moved from a left hand position, in which text "Personal" is highlighted, to a right hand position, in which text "Corporate" is highlighted. The movement of hand 307 is indicated by arrow 309 indicating that hand 307 is moving from left to right, and in turn moving slide switch 302 from the left hand position to the right hand position. Such movement of slide switch 302 initiates a change in a current workspace from first workspace 301 to second workspace 401, as described hereafter.

It is further appreciated that in views 3-I to 3-III, while first workspace 301 is one or more of current and active, second workspace is one or more of not current and inactive.

Views 3-I to 3-III depict a further aspect of workspace management by processor 120, in that one or more of first workspace 301 and a second workspace 401, as described below with reference to FIG. 4, can be locked. For example, as indicated by icon 311, a second workspace 401, associated with a "Corporate" workspace, is locked but can be unlocked by receipt of a password that is requested via a GUI 403, as depicted at view 3-III, GUI 403 provided when processor 120 detects the touch event associated with slide switch 302, described above.

In any event, once password data that matches stored password data is received at GUI 403, processor 120 causes a current workspace to change from first workspace 301 to second workspace 401. In other words, second workspace 401 changes to one or more of current and active, and first workspace 301 changes to one or more of not current and inactive.

For example, with reference to FIG. 4 and as depicted in view 3-IV, the GUI associated with first workspace 301 can be animated, appearing to flip upside down to show view 3-V depicted in FIG. 4. Indeed, view 3-V depicts second workspace 401 as described hereafter. In other words, the current workspace changes from first workspace 301 to second workspace 401. Furthermore, once password data is received at GUI 403 that matches stored password data, second workspace 401 is unlocked, as indicated at view 3-V by icon 411; in other words, icon 311 is replaced by icon 411.

It is yet further appreciated that GUI 403 is optional and that, in some implementations neither of workspaces 301, 401 is locked and current workspace can change from first workspace 301 to second workspace 401 by receiving touch input at touch slider 302. Indeed, when second workspace 401 is not locked, the change in the current workspace occurs when slider switch 302 is actuated.

In any event, as depicted in view 3-V, a graphical representation of second workspace 401 comprises icons 350-1, 350-2, 350-3, 350-4, 350-5, 350-6, 350-7. Icons 350-1, 350-2, 350-3, 350-4, 350-5, 350-6, 350-7 will be referred to generically as an icon 350 and collectively as icons 350. It is appreciated that each icon 350 corresponds to an application 150 associated with second workspace 401. Second workspace 401 can also be referred to as a "Corporate" workspace, as indicated in virtual slider switch 302: in other words, at views 3-V, the text "Corporate" is highlighted on slider switch 302.

Further, each icon 350 of second workspace 401 is associated with a respective application 150 which is in turn associated with tags "C". Indeed, in second workspace 401, only those icons 350 associated with applications with tags "C" are provided at first workspace 301. When an icon 350 is actuated, for example via a touch screen interaction, the corresponding application 150 will be processed by processor 120 and launched for interaction with a user via display 126 and input device 128. Further, when second workspace 401 is unlocked, as described above, icons 350 become accessible via touch events, such that corresponding applications 150 can be accessed.

It is yet further appreciated that processor 120 generally restricts access of applications 150 associated with second workspace 401 to data 170 and/or accounts 175 associated with second workspace 401. In other words, applications 150 associated with second workspace 401 can only access data 170 with tags "C".

An exception to this restriction can occur when an application 150 is associated with more than one of workspaces 301, 401. For example, application 150-2 is tagged with both "C" and "P" and hence is associated with both workspaces 301, 401. Hence, application 150-2 can access data 170 and/or accounts 175 associated with either workspace 301, 401, regardless of which workspace 301, 401 is a current workspace.

Further, an icon 250 can correspond to application 150-2, and an icon 350 can also correspond to application 150-2 common to both workspaces 301, 401.

Other than this exception, second workspace 401 can be defined by view 3-V in which only those icons 350 associated with applications 150 that are in turn associated with second workspace 401, are provided at display 126. However, second workspace 401 can further be defined by the association of applications 150 and data 170 (and accounts 175) with tags 180 associated with second workspace 401, as well as the restriction of access to data 170 and accounts 175 associated with second workspace 401. Put another way, a perimeter is placed around applications 150, data 170 and accounts 175 based on an association with tags "C", such that applications 150 associated with tag "P" cannot access or interact with applications 150, data 170 and accounts 175 associated with tag "C". This prevents cross-contamination of applications 150, data 170 (and accounts 175) associated with different tag types.

It is further appreciated that when the current workspace changes to second workspace 401, at least one identifier 405 is provided at second workspace 401, at least one identifier 405 associated with second workspace 401. It is yet further appreciated that at least one identifier 405 is provided at display 126 only when the current workspace comprises second workspace 401. Hence, at least one identifier 405 further comprises a current workspace identifier. When current workspace changes back to first workspace 301, and second workspace 401 is no longer current and/or active, at least one identifier 405 is no longer provided and a current workspace identifier associated with whatever workspace is current is provided: for example, when current workspace changes back to first workspace 301, at least one identifier 305 is again provided at display 126.

It is yet further appreciated that as second workspace 401 can be locked, second workspace 401 comprises a private workspace. As first workspace 301 is not lockable, first workspace 301 comprises a public workspace. Hence, at block 201, processor 120 is further enabled to manage the private and public aspects of workspaces 301, 401. In other words, processor 120 is enabled to manage associated passwords and when a lockable workspace is locked or unlocked. For example, in some implementations, second workspace 401 must be unlocked when current workspace changes to second workspace 401; for example, in view 3-V, second workspace 401 is both current and unlocked, but when slider switch 302 is actuated back to "Personal", and current workspace changes to first workspace 301, second workspace 401 is automatically locked and/or relocked. Alternatively, once second workspace 401 is unlocked, second workspace 401 remains unlocked until a specific command is received at device 101, for example via input device 128, to lock second workspace 401. In yet further implementations, second workspace 401 remains unlocked for a given period of time after touch event associated with second workspace 401; in other words, when second workspace 401 remains unaccessed via input device 128 for a given period of time, second workspace 401 is relocked. Other schemes for locking second workspace 401 are within the scope of present implementations. Further, while present implementations are described with respect to first workspace 301 comprising an unlockable workspace, in other implementations, first workspace 301 can be locked similar to second workspace 401.

Figure 5:
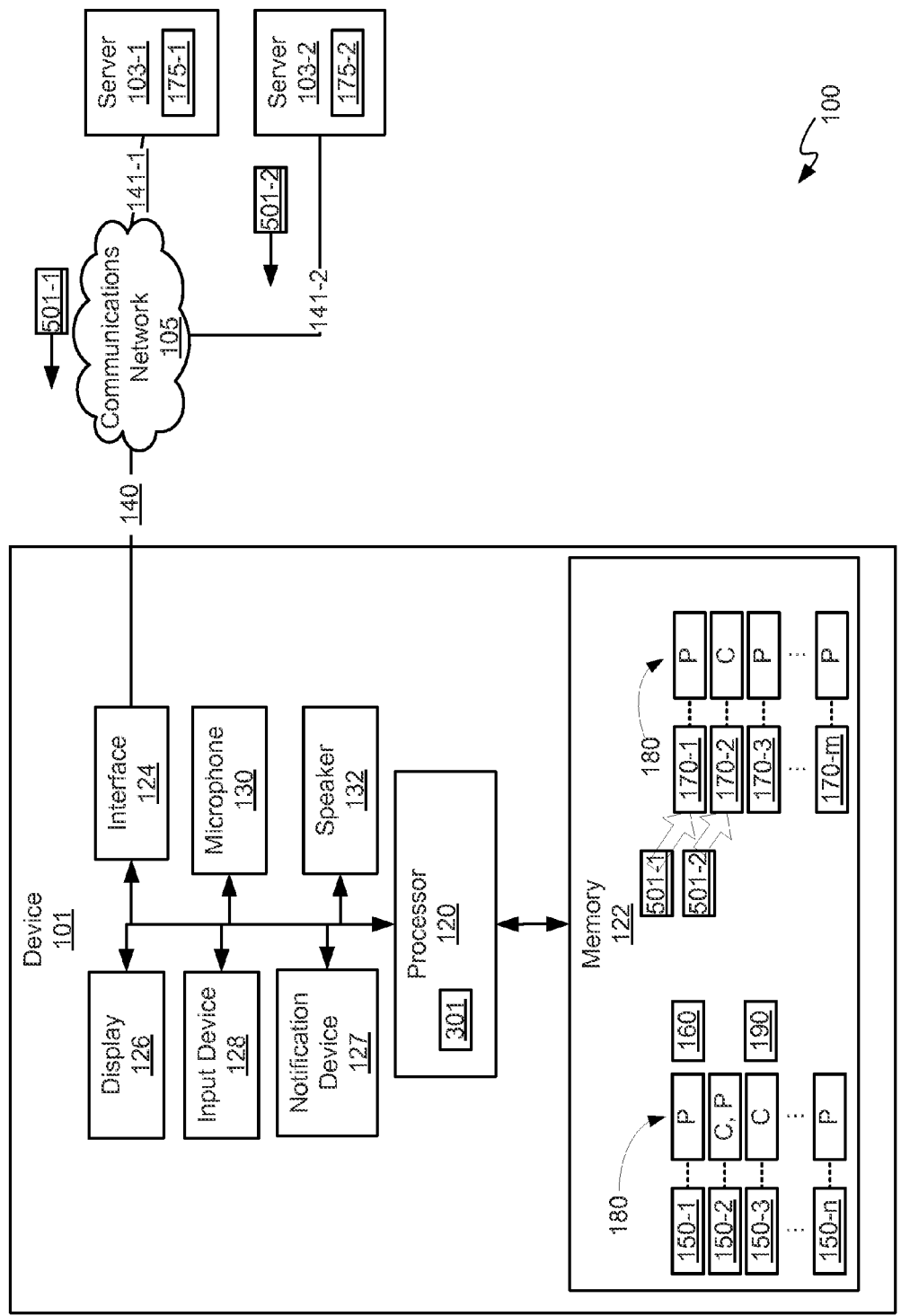
FIG. 5 depicts the system of FIG. 1 with messages associated with two different workspaces received at the device, while a current workspace comprises a first workspace, according to non-limiting implementations.

Attention is next directed to FIG. 5, which is substantially similar to FIG. 1, with like elements having like numbers. However, in FIG. 5 messages 501-1, 501-2 are respectively received at device 101 from servers 103-1, 103-2 via network 105 and links 140, 141. Further, processor 120 is presently processing first workspace 301 such that a current workspace comprises first workspace 301. It is further assumed that message 501-1 is associated with first workspace 301 and message 501-2 is associated with second workspace 401 which is currently one or more of not current and inactive. Messages 501-1, 501-2 will be interchangeably referred to hereafter, collectively, as messages 501 and generically as a message 501.

It is yet further assumed that, when messages 501 are received at device 101, each message 501 is stored at memory 122, for example in a respective set of data 170 associated with a workspace 301, 401 in turn associated with each message 501. For example, message 501-1 can be stored in data 170-1 as both message 501-1 and data 170-1 are associated with first workspace 301 (e.g. data 170-1 is tagged with "P"); similarly, message 501-2 can be stored in data 170-2 as both message 501-2 and data 170-2 are associated with second workspace 401 (e.g. data 170-1 is tagged with "C").

Figure 6:
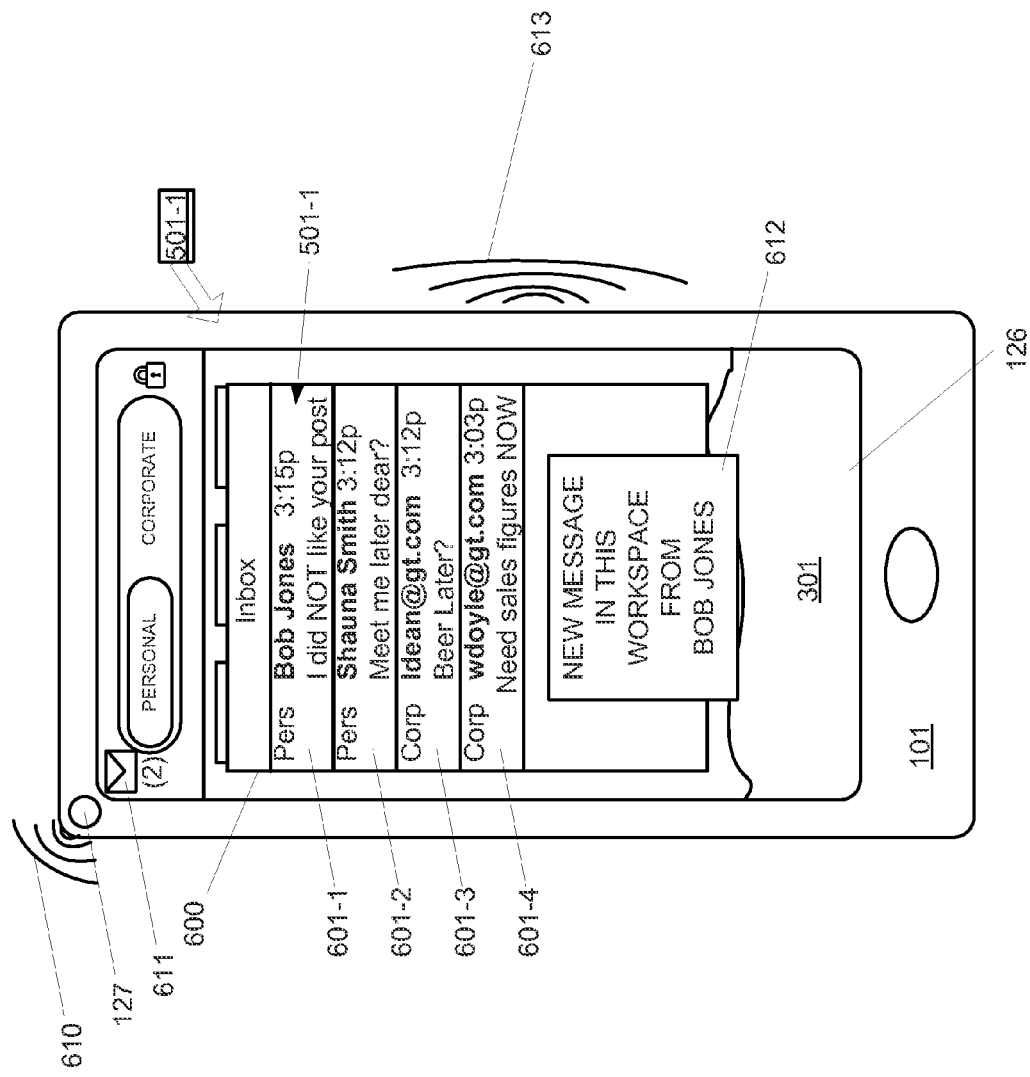
FIG. 6 depicts a perspective view of the device of FIG. 1 when a current workspace comprises a first workspace, and a message associated with the first workspace is received, according to non-limiting implementations.

Attention is next directed to FIG. 6, which depicts a GUI of application 150-2 (associated with both workspaces 301, 401) when message 501-1 arrives at device 101, a current workspace comprises first workspace 301, as in FIG. 5, and method 200 is being implemented at processor 120. Indeed, it is assumed in FIG. 6 that message 501-2 has not yet arrived at device 101: in other words, message 501-1 arrives at device 101 before message 501-2. FIG. 6 is otherwise similar to view 3-I of FIG. 3, with like elements having like numbers.

It is further appreciated that, in depicted implementations, application 150-2 comprises a messaging application receiving messages from both servers 103, and hence the GUI comprise a unified mailbox 600 comprising a plurality of fields 601-1, 601-2, 601-3, 601-4 (collectively fields 601, and generically a field 601) each corresponding to a message at mailbox 600. While four messages are depicted at mailbox 600, one in each field 601, the number of messages at mailbox 600 is generally appreciated to be non-limiting. Further, mailbox 600 is provided by processor 120 at display 126, for example, when an icon 250 associated with application 150-2 is actuated, and/or when an icon 350 associated with application 150-2 is actuated.

Each field 601 comprises a time (and/or a date, not depicted), and an indication of a workspace 301, 401 associated with respective messages, as depicted, though an indication of an account 175 can alternatively be provided: for example, the textual indicators "Pers" and "Corp" each indicate a different workspace 301, 401 (i.e. "Pers" indicates first workspace 301 and "Corp" indicates second workspace 401) associated with respective messages, which in turn are associated with different accounts 175. For example, first workspace 301 is associated with account 175-1 at server 103-1, and second workspace 401 is associated with account 175-2 at server 103-2. In other words, device 101 is enabled to receive messages associated with each of accounts 175.

Further, while textual indicators are depicted, in other implementations, graphical indicators and/or a combination of textual and graphical indicators could be provided.

It is further appreciated that the depicted indication of account is optional and is provided to better illustrate method 200. In yet further implementations, an indication of an account 175 can be provided (e.g. an indication of whether a message in a field 601 has been received from a social networking account, an email account and the like).

In addition, each field 601 can comprise an indication of a sender of the respective message (e.g. "Bob Jones", "Shauna Smith", "Idean@gt.com", and "wdoyle@gt.com"), a time that a respective message is received, and a subject of the respective message (e.g. on the second line of each field 601). At least the sender and the subject can be received with a respective message in a respective header and/or metadata of the message. Further, while sender of a respective message can be indicated via an electronic address and/or a natural name, when a natural name is indicated, it is appreciated that an electronic address can be received in metadata associated with a respective message.

In depicted implementations, each field 601 further indicates a subject of each message (e.g. "Beer Later" in field 601-3) on a second line of each field 601, however, the content of each field 601 is generally non-limiting and can include any suitable indication of a respective message.

It is also assumed in FIG. 6 that messages associated with fields 601-1, 601-2 are messages associated with account 175-1 that is in turn associated with first workspace 301 received from server 103-1, as indicated by the identifier "Pers". Similarly, it is assumed in FIG. 6 that messages associated with fields 601-3, 601-4 are messages associated with account 175-2 that is in turn associated with second workspace 401 received from server 103-2, as indicated by the identifier "Corp".

It is yet further assumed that the field 601-1 comprises message 501-1, and that message 501-1 is provided at the top of mailbox 600 as message 501-1 is the most recent message to be received.

In any event, as message 501-1 is associated with first workspace 301, and as a current workspace comprises first workspace 301, processor 120 controls notification device 127 to present first notifications associated only with first workspace 301, while second notifications associated with the second workspace are not presented.

For example, in FIG. 6, when message 501 is received at device 101, notification device 127 is controlled to provide a notification 610, for example a visual notification, such as a blinking light and/or an audio notification, such as playing an audio file. Alternatively display 126 can be used as a notification device and processor 120 can present a message icon 611 at display 126, for example at a status bar, and/or processor 120 can present a text box 612, and the like, indicating that a new message associated with first workspace 301 have been received: for example text box 612 can comprise an indication of a sender of message 501-1 (e.g. "Bob Jones"). In yet a further alternative, a vibratory motor can be controlled to cause a vibration 613 to occur at device 101. It is further appreciated that message icon 611 is provided with a number of messages (i.e. "2" messages) in mailbox 600 associated with the current workspace (i.e. first workspace 301), even though mailbox 600 shows four messages.

Figure 7:
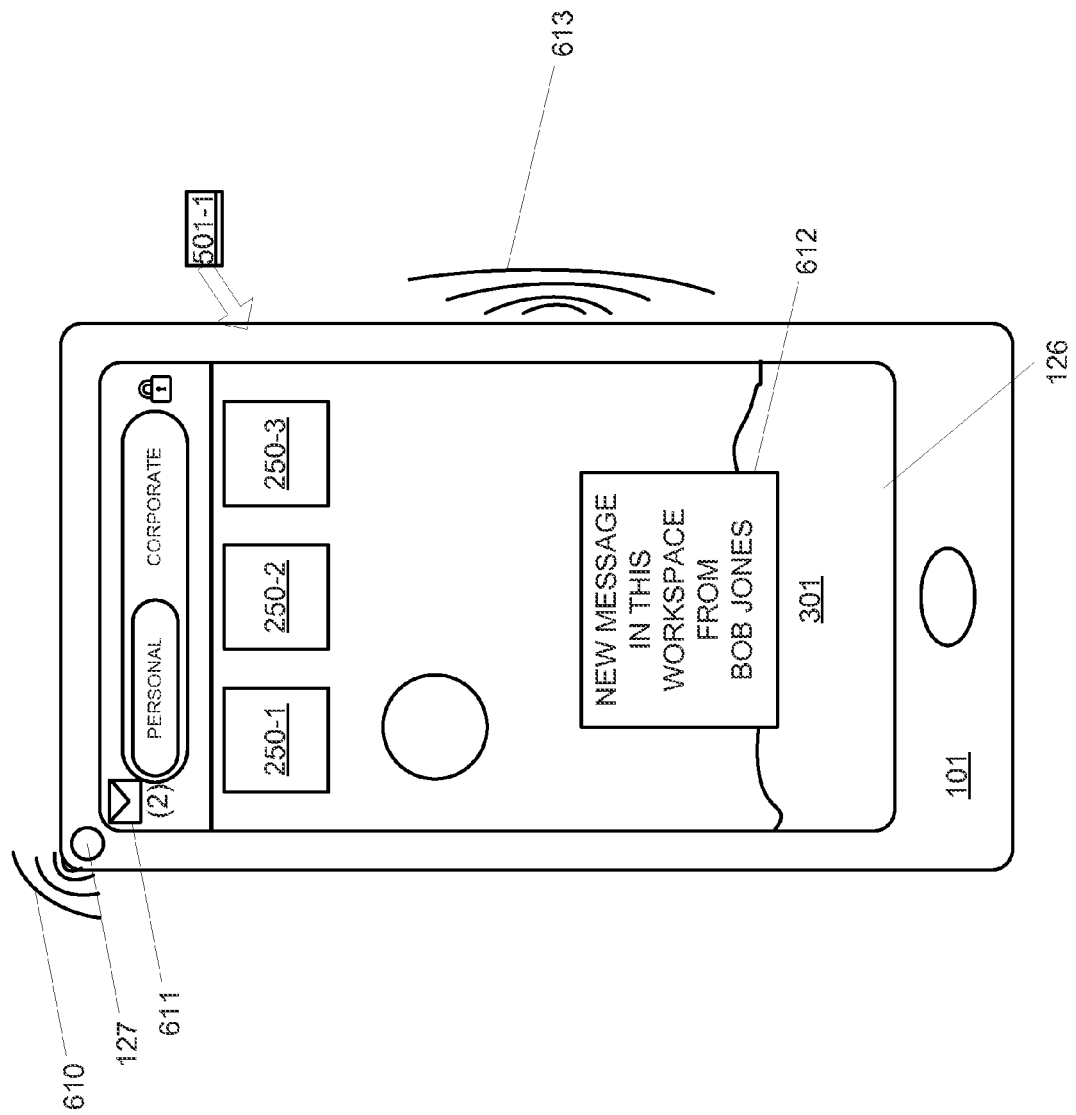
FIG. 7 depicts a perspective view of the device of FIG. 1 when a current workspace comprises a first workspace, and a message associated with the first workspace is received, according to alternative non-limiting implementations.

In yet a further alternative depicted in FIG. 7, which is substantially similar to FIG. 6, with like elements having like numbers, notification 610, message icon 611, text box 612 and/or vibration 613 can be provided regardless of whether mailbox 600 is presented at display 126; indeed, in FIG. 7, notification 610, message icon 611, text box 612 and/or vibration 613 are provided when message 501-1 is received and when mailbox 600 is not presented at display 126 (again assuming that a current workspace comprises first workspace 301).

Figure 8:
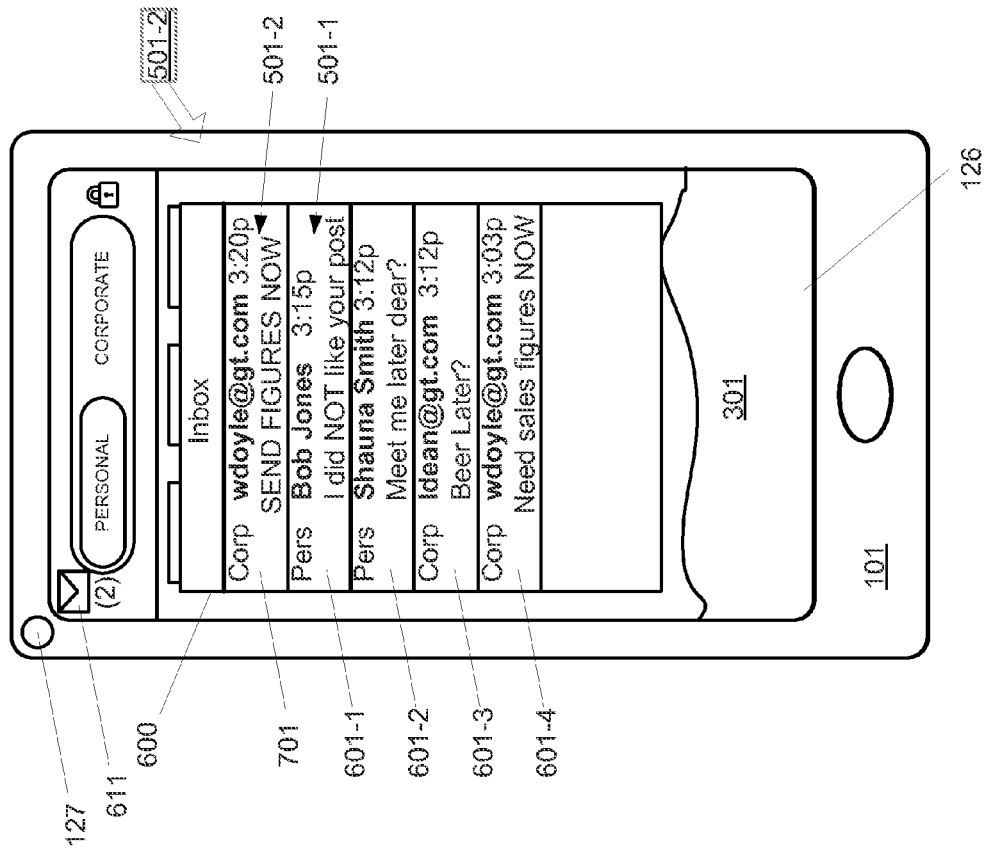
FIG. 8 depicts a perspective view of the device of FIG. 1 when a current workspace comprises a first workspace, and a message associated with the second workspace is received, according to non-limiting implementations.

Attention is next directed to FIG. 8, which is substantially similar to FIG. 6, with like elements having like numbers, except that in FIG. 8, message 501-2 has been received at device 101, and mailbox 600 has been updated to comprise a new field 701 comprising message 501-2. However, as message 501-2 is not associated with the current work space (i.e. first workspace 301), no notifications are provided. For example, message icon 611 still indicates that "2" messages are associated with the current workspace even though a new message 501-2 has been received. Further, no notifications are presented at notification device 127, no vibration occurs and no text boxes are presented at display 126. Indeed, notifications of message 501-2 are one or more of suppressed and delayed until the current workspace changes to second workspace 401.

Figure 9:
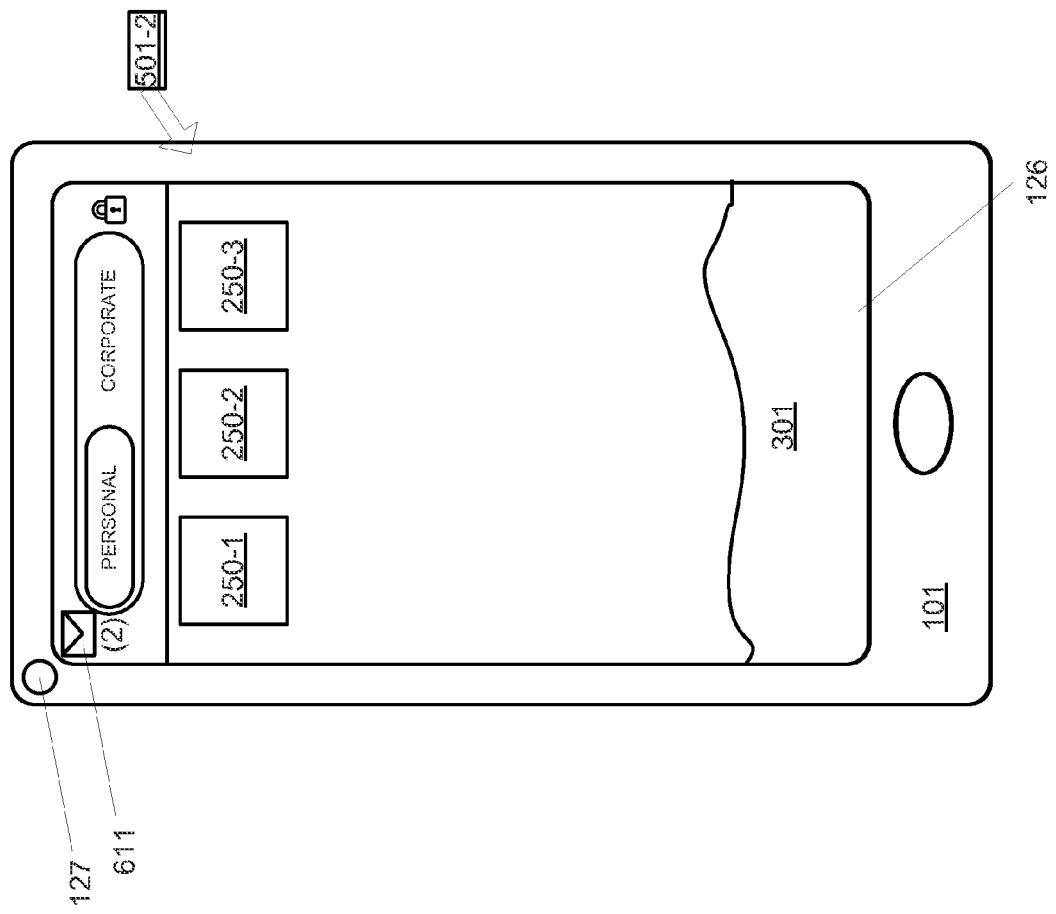
FIG. 9 depicts a perspective view of the device of FIG. 1 when a current workspace comprises a first workspace, and a message associated with the second workspace is received, according to alternative non-limiting implementations.

In yet a further alternative depicted in FIG. 9, which is substantially similar to FIG. 8, with like elements having like numbers, message 501-2 has been received at device 101, and mailbox 600 is not presented at display 126. Further, as message 501-2 is not associated with the current work space (i.e. first workspace 301), no notifications are provided. For example, message icon 611 still indicates that "2" messages are associated with the current workspace even though a new message 501-2 has been received. Further, no notifications are presented at notification device 127, no vibration occurs and no text boxes are presented at display 126. Indeed, notifications of message 501-2 are one or more of suppressed and delayed until the current workspace changes to second workspace 401.

From the example described with reference to FIGS. 5 to 9, it is further appreciated messages 501 are associated with different accounts 175. For example, message 501-1 can be associated with account 175-1 (in turn associated with first workspace 301 and server 103-1) and message 501-2 can be associated with account 175-2 (in turn associated with second workspace 401 and server 103-2). Hence, processor 120 is further enabled to, when the current workspace comprises first workspace 301, control notification device 127 to present the first notifications (e.g. notification 610, message icon 611, text box 612 and/or vibration 613) for a first account 175-1 associated with first workspace 301, while second notifications associated with a second account 175-2 associated with the second workspace are not presented.

It is yet further appreciated that while presently described examples of method 200 are directed to notifications of messages, present implementations are not so limiting and method 200 can be applied to notifications of any event at device 101 for which a notification can be presented including, but not limited to, calendar events, task reminders, software update notifications and the like.

Figure 10:
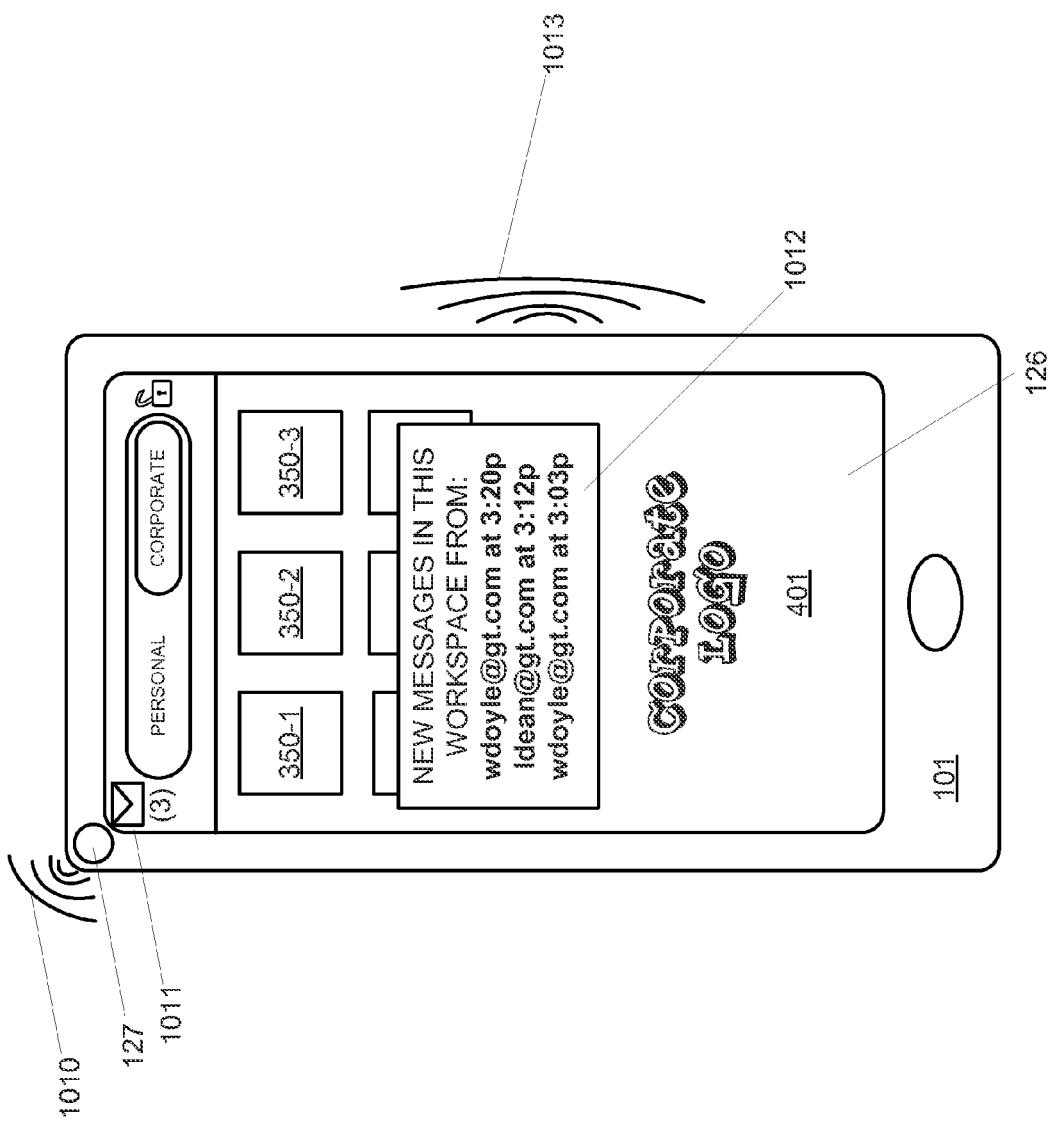
FIG. 10 depicts a perspective view of the device of FIG. 1 when a current workspace changes to a second workspace, according to non-limiting implementations.

Attention is next directed to FIG. 10, which is substantially similar to view 3-V of FIG. 4 after current workspace has changed to second workspace 401, as described above. However, as current workspace has changed to second workspace 401, processor 120 controls notification device 127 to present second notifications associated only with second workspace 401, while first notifications associated with the first workspace are not presented (and are one or more of suppressed and delayed).

For example, notification device 127 is controlled to provide a notification 1010, for example a visual notification, such as a blinking light and/or an audio notification, such as playing an audio file. Alternatively display 126 can be used as a notification device and processor 120 can present a message icon 1011 at display 126, for example at a status bar, and/or processor 120 can present a text box 1012, and the like, indicating that new messages associated with second workspace 401 have been received: text box 1012 can comprise respective indications of senders of any messages received since the last time the current workspace comprised second workspace 401, including, but not limited to an indication of a sender of message 501-2 (e.g. "wdoyle@gt.com"). Hence, it is further assumed in FIG. 10 that messages associated with fields 601-3, 601-4 (as in FIG. 6) were received since the last time the current workspace comprised second workspace 401 and/or while the current workspace comprised first workspace 301, as in FIGS. 5 to 9; it is further appreciated that mailbox 600 is not presented in FIG. 10, but optionally could be provided, as in FIGS. 6 and 8.

Further, as depicted in FIG. 10, each indication of a sender of a message in text box 1012 is provided with a time the messages were received.

In yet a further alternative, a vibratory motor can be controlled to cause a vibration 1013 to occur at device 101.

Further, message icon 1011 is provided with a number of messages (i.e. "3" messages) in mailbox 600 associated with the current workspace (i.e. second workspace 401), regardless of the total number of messages in mailbox 600, and regardless of whether mailbox 600 is presented. In other words, while mailbox 600 is not depicted in FIG. 10, it is assumed in FIG. 10 that mailbox 600 has not changed from FIG. 8. It is yet further appreciated that, when new messages are received that are associated with first workspace 301, no notifications are provided via notification device 127, similar to FIG. 8.

In other words, message 501-2, and any other messages received at device 101 associated with second workspace 401 while the current workspace comprises first workspace 301, is stored at device 101, for example in memory 122 and/or in data 170-2, as described above. Indeed, any indications of events associated with second workspace 401, for which a notification can be presented that occur at device 101 when first workspace 301 is current can be stored in memory 122 and/or in data 170 associated with second workspace 401.

Hence, when current workspace changes to second workspace 401, notification device 127 is controlled to provide notifications of indications of events associated with second workspace 401 stored at memory 122 while the current workspace comprised the first workspace 301. In other words, in these implementations, processor 120 is further enabled to store indications of events associated with second workspace 401 while the current workspace comprises first workspace 301, and when the current workspace changes to second workspace 401, control notification device 127 to present the second notifications of the indications of events that have been previously stored.

From FIGS. 5 to 10 it is further appreciated that first notifications 610 to 613 and second notifications 1010 to 1013 are each associated with application 150 that is in turn associated with one or more of first workspace 301 and second work space 401, and first notifications 610 to 613 and second notifications 1010 to 1013 are associated with respective accounts 175 associated with first workspace 301 and second workspace 401.

Scenarios are now considered in which a given number of events associated with second workspace 401 occur while the current workspace comprises first workspace 301, the given number of events being above a threshold number of events. For example, such a threshold number of events can comprise a number of events that correspond to a number of notifications that can be provided at display 126, such as at text box 1012, in a given font.

Alternatively, the threshold number of events can comprise a number of events that correspond to a number of notifications that a human being is likely to pay attention to, for example as determined from human-machine-interaction (HMI) measurements/experiments.

In any event, when the number of events is above the threshold number, a limit can be placed on the number of notifications provided at device 101 when the current workspace changes to second workspace 401. Such a limit can be one or more of number based and/or time based. For example, processor 120 can be further enabled to: store indications of events associated with second workspace 401 while the current workspace comprises first workspace 301, and when the current workspace changes to second workspace 301, control notification device 127 to present one or more of: a given number of the second notifications of the indications of events that have been previously stored; and the second notifications of the indications of events that have been previously stored within a given time period.

Figure 11:
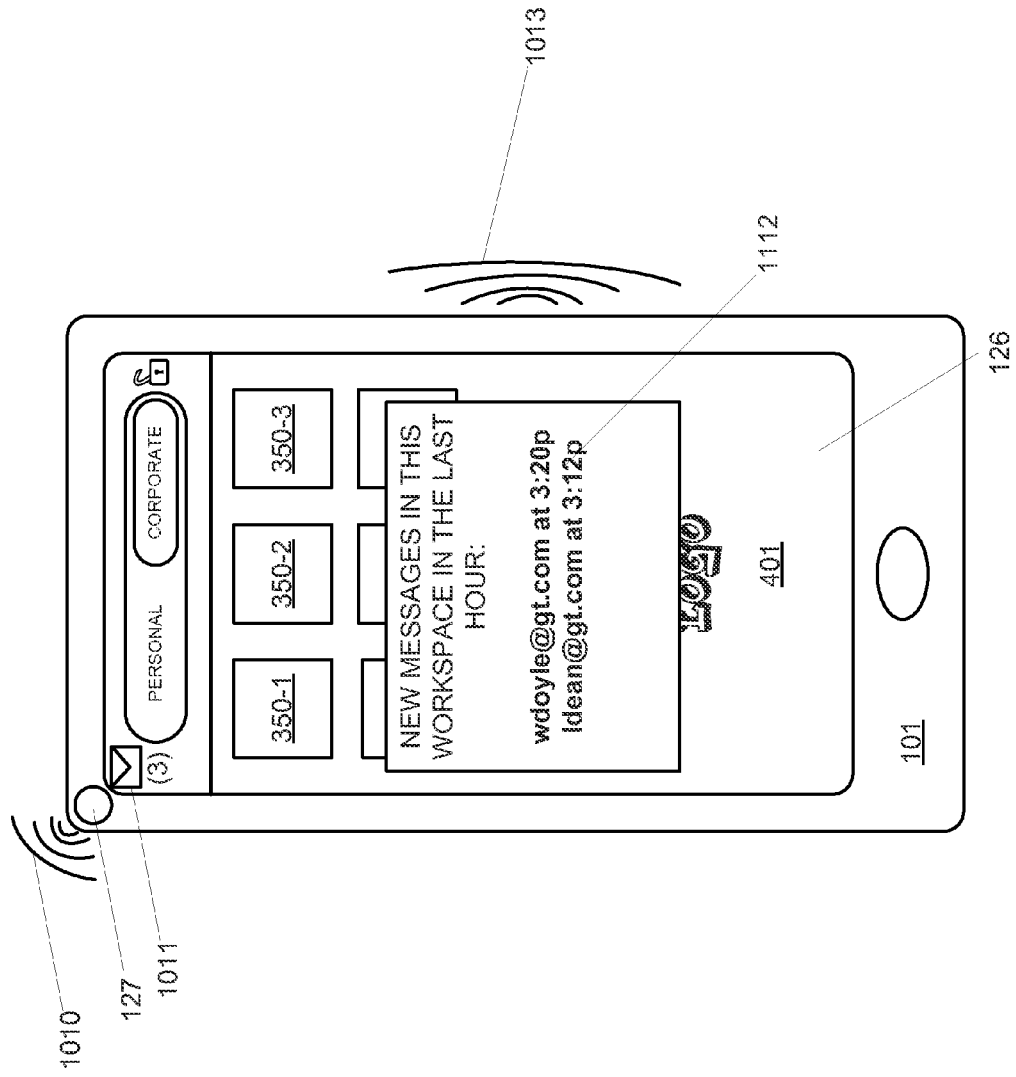
FIG. 11 depicts a perspective view of the device of FIG. 1 when a current workspace changes to a second workspace, according to alternative non-limiting implementations.

For example, attention is next directed to FIG. 11, which is substantially similar to FIG. 10, with like elements having like numbers, however a text box 1112 is provided at display 126 in which a number of messages that have been received within the hour prior to the current workspace changing from first workspace 301 to second workspace 401. It is appreciated that is assumed that the message received at 3:03 p (e.g. as in field 601-4 of FIG. 6) was not received within the hour and hence no notification therefor is presented.

In any event, it is appreciated from FIGS. 10 and 11 that notifications for events associated with second workspace 401, that occur while a current workspace comprises first workspace 301, are delayed until the current workspace changes to second workspace 401.

Figure 12:
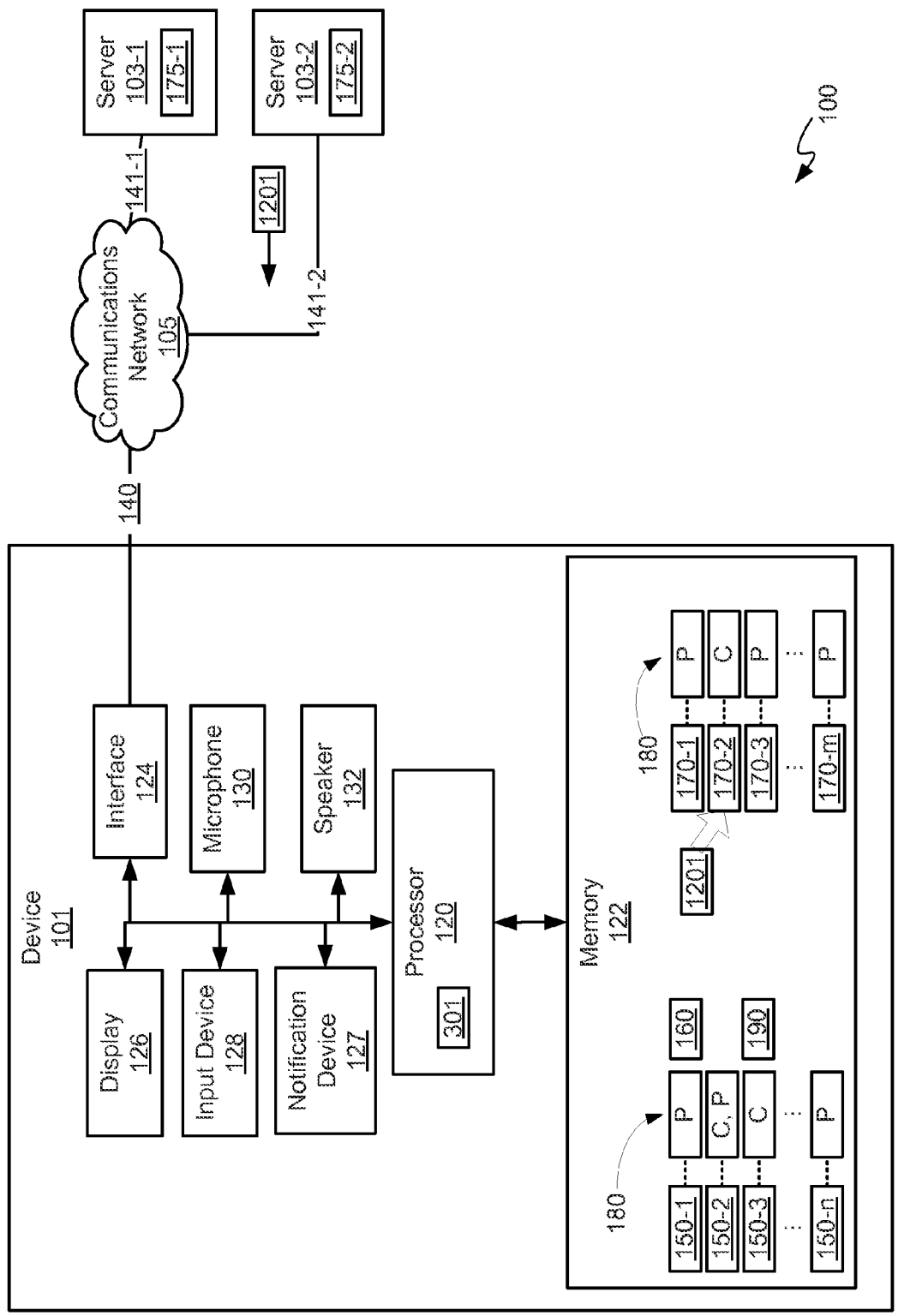
FIG. 12 depicts the system of FIG. 1 when a current workspace comprises a first workspace, and a message associated with the second workspace is received, the message meeting an exception condition, according to alternative non-limiting implementations.

Attention is next directed to FIG. 12, which is substantially similar to FIG. 1, with like elements having like numbers. In FIG. 12, it is again assumed that the current workspace comprises first workspace 301, as in FIGS. 5 to 9. However, in FIG. 12, a message 1201 associated with account 175-2 is received at device 101 from server 103-2. Hence, message 1201 is associated with second workspace 401, which is not a current workspace in FIG. 12.

Figure 13:
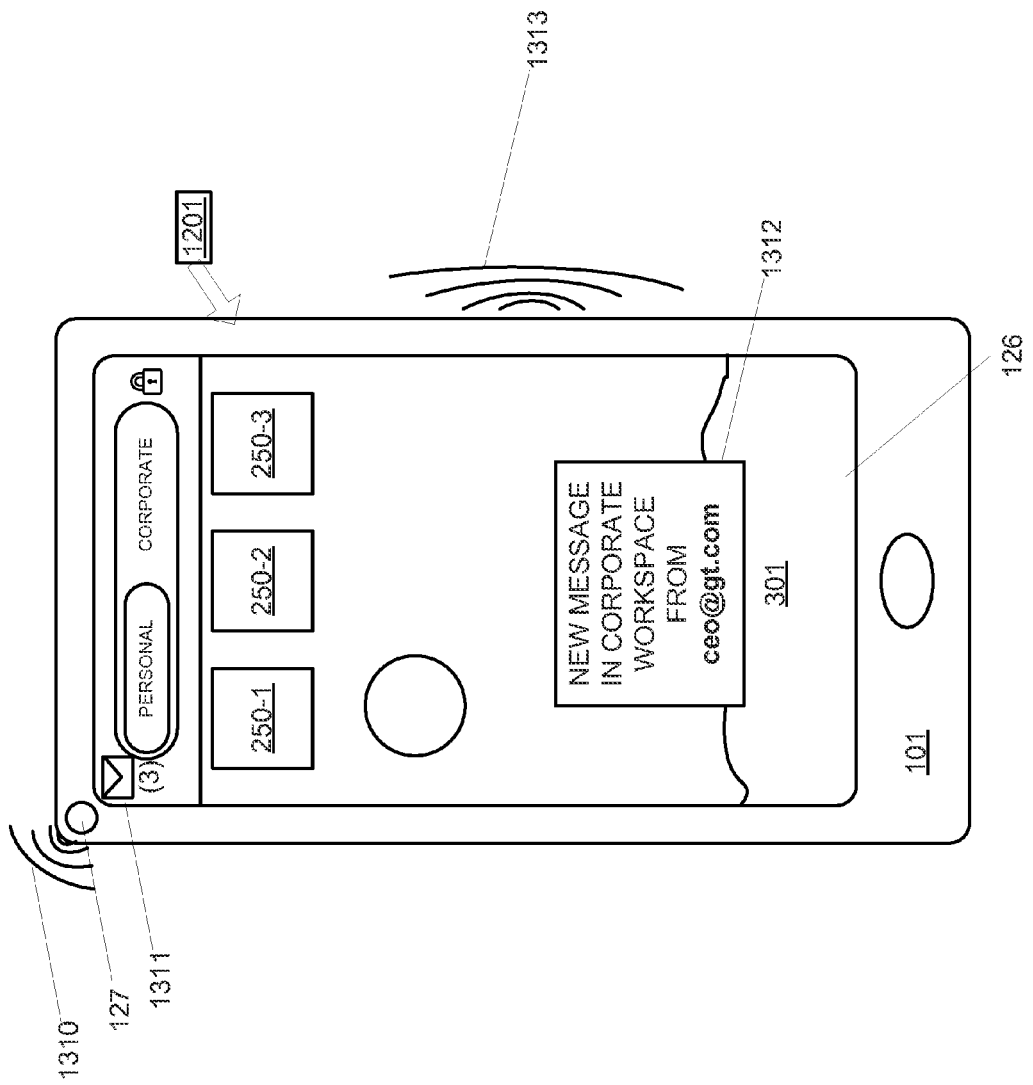
FIG. 13 depicts a perspective view of the device of FIG. 1 when a current workspace comprises a first workspace, and a message associated with the second workspace is received, the message meeting an exception condition, according to alternative non-limiting implementations.

However, it is further assumed in FIG. 12 that message 1201 is from a sender that is associated with one of the exception conditions 190, described above. For example, an electronic address associated with message 1201 can be stored in exception conditions 190. Hence, while message 1201 is associated with second workspace 401 (and hence can be stored at data 170-2) notifications associated therewith are in turn associated with the exception conditions. Message 1201 is in contrast to message 501-2 which is not associated with exception conditions 190. Indeed, as depicted in FIG. 13 (substantially similar to FIG. 9, with like elements having like numbers), when message 1201 is received at device 101, notification device 127 is controlled to provide a notification 1310, for example a visual notification, such as a blinking light and/or an audio notification, such as playing an audio file. Alternatively display 126 can be used as a notification device and processor 120 can present a message icon 1311 at display 126, for example at a status bar, and/or processor 120 can present a text box 1312, and the like, indicating that a new message associated with second workspace 401: for example text box 1312 can comprise an indication of a sender of message 1201 (e.g. "ceo@gt.com"). In yet a further alternative, a vibratory motor can be controlled to cause a vibration 1313 to occur at device 101. It is further appreciated that message icon 1311 is provided with a number of messages (i.e. "3" messages) in mailbox 600 associated with the current workspace (i.e. first workspace 301), as well as messages that meet exception conditions 190 associated with exception conditions 190.

In other words, memory 122 stores exception conditions 190 and processor 120 is further enabled to control notification device 127 to present first notifications and second notifications associated with one or more of exception conditions 190, regardless of whether the current workspace comprises first workspace 301 or second workspace 401.

Such exceptions conditions can be used to ensure that messages from spouses, family members, managers, CEOs (chief executive officers) and the like are provided at device 101, regardless of which workspace 301, 401 is current and which account 175 a message associated with an exception condition 190 is received from. For example, electronic addresses associated with spouses, family members, managers, CEOs and the like, and can be stored in exception conditions 190. It is further appreciated that exception conditions can be edited using an editing application to add and/or remove electronic addressed therefrom, and/or to add and/or remove any logic rules on how to handle notifications that meet one or more exception conditions 190. For example, exception conditions 190 can further comprise times during which exception conditions can apply, and the like.

In yet further implementations, exception conditions 190 can further comprise providing notifications for messages, events, and the like, that have been flagged as important.

It is yet further appreciated that while present implementations have been described with regard to two workspaces 301, 401, method 300 can be applied to more than two workspaces. For example rather than a virtual slider switch, workspaces can be changed via a pulldown menu and the like. In these implementations, processor 120 can be enabled to: manage a first workspace and a plurality of further workspaces distinguished from each other by one or more of: data stored at the memory and accounts being associated a respective one of the first workspace and the plurality of further workspaces; and, when a current workspace comprises the first workspace, control the notification device to present first notifications associated only with the first workspace, while further notifications associated with the plurality of further workspaces are not presented.

Further, the processor 120 can be further enabled to, when the current workspace comprises the first workspace, control the notification device to present the first notifications for a first account associated with the first workspace, while further notifications associated with further accounts associated with the plurality of workspaces are not presented.

The processor 120 can be further enabled to: when the current workspace changes to a given workspace of the plurality of further workspaces, control the notification device to present given notifications associated only with the given workspace, while the first notifications associated with the first workspace are not presented.

The processor 120 can be further enabled to: store indications of events associated with the plurality of further workspaces while the current workspace comprises the first workspace, and when the current workspace changes to a given workspace of the plurality of further workspaces, control the notification device to present given notifications of given indications of events associated with the given workspace that have been previously stored.

The processor 120 can be further enabled to: store indications of events associated with the second workspace while the current workspace comprises the first workspace, and when the current workspace changes to a given one of the plurality of further workspaces, control the notification device to present one or more of: a given number of further notifications of further indications of events associated with the given workspace that have been previously stored within a given time period; and the further notifications of the indications of events associated with the given workspace that have been previously stored within a given time period.

Each of the first workspace and the plurality of further workspaces are further distinguished from each other by one or more of respective partitions of the memory and respective virtual partitions of the memory.

The first notifications and the further notifications can be each associated with an application associated with one or more of the first workspace and the plurality of further workspaces, and the first notifications and the further notifications are associated with respective accounts associated with the first workspace and plurality of further workspaces.

In any event, by limiting notifications at device 101 to those notifications that are associated only with the current workspace are presented by a notification device (with the exception of those that meet exceptions conditions 190), only those notifications pertinent to the current workspace are provided. Thus, conveniently, notifications that are pertinent only to the current workspace are provided, and thus only those notifications that are pertinent to the present needs of a user, as indicated by the current workspace are provided.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
 a processor, a memory, and a notification device, the processor configured to:
  manage a first workspace and a second workspace distinguished from each other by at least messaging accounts being associated with the one or the another of the first workspace and the second workspace;
  when a current workspace comprises the first workspace, control the notification device to present first notifications for a first messaging account associated only with the first workspace, while second notifications for a second messaging account associated with the second workspace are not presented; and,
  when the current workspace changes to the second workspace, control the notification device to automatically present indications of any messages received in the second workspace while the first workspace was current and since a last time the second workspace was current, the messages received in the second workspace while the first workspace was current and since a last time the second workspace was current being one or more of suppressed and delayed while the first workspace was current.

2. The device of claim 1, wherein the processor is further configured to: manage the first workspace and a plurality of further workspaces; and, when the current workspace comprises the first workspace, control the notification device to present the first notifications for the first messaging account associated only with the first workspace, while further notifications for further messaging accounts associated with the plurality of further workspaces are not presented.

3. The device of claim 1, wherein the memory stores exception conditions and the processor is further configured to control the notification device to present the first notifications and the second notifications associated with one or more of the exception conditions, regardless of whether the current workspace comprises the first workspace or the second workspace.

4. The device of claim 1, wherein the processor is further configured to: when the current workspace changes to the second workspace, control the notification device to present the second notifications for the second messaging account associated only with the second workspace, while first notifications for the first messaging account associated with the first workspace are not presented.

5. The device of claim 1, wherein the processor is further configured to: store indications of messaging events associated with the second workspace while the current workspace comprises the first workspace, and when the current workspace changes to the second workspace, control the notification device to present the second notifications of the indications of messaging events that have been previously stored.

6. The device of claim 1, wherein the processor is further configured to: store indications of messaging events associated with the second workspace while the current workspace comprises the first workspace, and when the current workspace changes to the second workspace, control the notification device to present one or more of: a given number of the second notifications of the indications of messaging events that have been previously stored within a given time period; and the second notifications of the indications of messaging events that have been previously stored within a given time period.

7. The device of claim 1, wherein each of the first workspace and the second workspace are further distinguished from each other by one or more of respective partitions of the memory and respective virtual partitions of the memory.

8. The device of claim 1, wherein the first workspace comprises one of a private workspace and a public workspace and the second workspace comprises an other of the private workspace and the public workspace.

9. The device of claim 1, wherein the first notifications and the second notifications are each associated with a messaging application associated with one or more of the first workspace and the second work space, and the first notifications and the second notifications are further associated with respective messaging accounts associated with the first workspace and the second workspace.

10. The device of claim 1, wherein the notification device comprises a display, and the indications of the messages received in the second workspace since the last time the second workspace was current comprise respective indicators of senders of the messages presented in a text box at the display.

11. The device of claim 1, wherein the notification device comprises a display, and the indications of the messages received in the second workspace since the last time the second workspace was current comprise respective indicators of senders of the messages presented in a text box at the display.

12. A method comprising:
 managing a first workspace and a second workspace at a processor of a device comprising the processor, a memory and a notification device, the first workspace and the second workspace distinguished from each other by at least messaging accounts being associated with the one or the another of the first workspace and the second workspace;
 when a current workspace comprises the first workspace, controlling, at the processor, the notification device to present first notifications for a first messaging account associated only with the first workspace, while second notifications for a second messaging account associated with the second workspace are not presented; and, when the current workspace changes to the second workspace, controlling the notification device to automatically present indications of any messages received in the second workspace while the first workspace was current and since a last time the second workspace was current, the messages received in the second workspace while the first workspace was current and since a last time the second workspace was current being one or more of suppressed and delayed while the first workspace was current.

13. The method of claim 12, further comprising: managing, via the processor, the first workspace and a plurality of further workspaces; and, when the current workspace comprises the first workspace, controlling, via the processor, the notification device to present first notifications for the first messaging account associated only with the first workspace, while further notifications for further messaging accounts associated with the plurality of further workspaces are not presented.

14. The method of claim 12, wherein the memory stores exception conditions and the method further comprises controlling, via the processor, the notification device to present the first notifications and the second notifications associated with one or more of the exception conditions, regardless of whether the current workspace comprises the first workspace or the second workspace.

15. The method of claim 12, further comprising, when the current workspace changes to the second workspace, controlling, via the processor, the notification device to present the second notifications for the second messaging account associated only with the second workspace, while first notifications for the first messaging account associated with the first workspace are not presented.

16. The method of claim 12, further comprising, storing indications of events associated with the second workspace while the current workspace comprises the first workspace, and when the current workspace changes to the second workspace, controlling the notification device to present the second notifications of the indications of messaging events that have been previously stored.

17. The method of claim 12, further comprising, storing indications of messaging events associated with the second workspace while the current workspace comprises the first workspace, and when the current workspace changes to the second workspace, controlling the notification device to present one or more of: a given number of the second notifications of the indications of messaging events that have been previously stored within a given time period; and the second notifications of the indications of messaging events that have been previously stored within a given time period.

18. The method of claim 12, wherein the first notifications and the second notifications are each associated with a messaging application associated with one or more of the first workspace and the second work space, and the first notifications and the second notifications are associated with respective messaging accounts associated with the first workspace and the second workspace.

19. The method of claim 12, wherein the notification device comprises a display, and the indications of the messages received in the second workspace since the last time the second workspace was current comprise respective indicators of senders of the messages presented in a text box at the display.

20. A non-transitory computer-readable medium storing a computer program, wherein execution of the computer program is for:

managing a first workspace and a second workspace at a processor of a device comprising the processor, a memory and a notification device, the first workspace and the second workspace distinguished from each other by at least messaging accounts being associated with the one or the another of the first workspace and the second workspace;

when a current workspace comprises the first workspace, controlling, at the processor, the notification device to present first notifications for a first messaging account associated only with the first workspace, while second notifications for a second messaging account associated with the second workspace are not presented; and when the current workspace changes to the second workspace, controlling the notification device to automatically present indications of any messages received in the second workspace while the first workspace was current and since a last time the second workspace was current, the messages received in the second workspace while the first workspace was current and since a last time the second workspace was current being one or more of suppressed and delayed while the first workspace was current.

* * * * *